(12) United States Patent
Chen

(10) Patent No.: US 11,496,058 B2
(45) Date of Patent: Nov. 8, 2022

(54) POWER CONVERTER

(71) Applicant: Chicony Power Technology Co., Ltd., New Taipei (TW)

(72) Inventor: Chi-Chun Chen, New Taipei (TW)

(73) Assignee: Chicony Power Technology Co., Ltd., New Taipei (TW)

( * ) Notice: Subject to any disclaimer, the term of this patent is extended or adjusted under 35 U.S.C. 154(b) by 148 days.

(21) Appl. No.: 17/074,644

(22) Filed: Oct. 20, 2020

(65) Prior Publication Data

US 2022/0094273 A1 Mar. 24, 2022

(30) Foreign Application Priority Data

Sep. 23, 2020 (TW) ................................. 109132825

(51) Int. Cl.
*H02M 3/335* (2006.01)

(52) U.S. Cl.
CPC .............................. *H02M 3/33576* (2013.01)

(58) Field of Classification Search
CPC ............ H02M 3/33576; H02M 3/335; H02M 3/33507; H02M 3/33523; H02M 1/0032
See application file for complete search history.

(56) References Cited

U.S. PATENT DOCUMENTS

| 8,533,508 | B2 | 9/2013 | Chang et al. | |
|---|---|---|---|---|
| 9,240,726 | B1 * | 1/2016 | Xiong | H02M 3/33507 |
| 10,172,197 | B1 * | 1/2019 | Gao | H05B 45/385 |
| 10,581,240 | B2 * | 3/2020 | Peng | G06F 1/30 |
| 11,121,621 | B1 * | 9/2021 | Chen | H02M 3/33576 |
| 2008/0043504 | A1 * | 2/2008 | Ye | H02M 3/33507 363/97 |
| 2016/0118898 | A1 | 4/2016 | Peng et al. | |
| 2017/0331371 | A1 | 11/2017 | Parto | |
| 2018/0019677 | A1 | 1/2018 | Chung et al. | |
| 2018/0309287 | A1 | 10/2018 | Peng | |
| 2019/0089258 | A1 | 3/2019 | Giuliano et al. | |
| 2019/0199222 | A1 | 6/2019 | Lin et al. | |
| 2019/0245450 | A1 | 8/2019 | Chung et al. | |
| 2020/0169178 | A1 | 5/2020 | Peng et al. | |
| 2020/0251983 | A1 | 8/2020 | Peng et al. | |
| 2020/0251992 | A1 | 8/2020 | Peng et al. | |

FOREIGN PATENT DOCUMENTS

| CN | 201774469 | 3/2011 |
|---|---|---|
| CN | 102545575 | 7/2012 |
| TW | 200619911 | 6/2006 |
| TW | 200838107 | 9/2008 |
| TW | 201033784 | 9/2010 |
| TW | I350633 | 10/2011 |
| TW | 201720034 | 6/2017 |
| TW | 202005238 | 1/2020 |

OTHER PUBLICATIONS

"Office Action of Taiwan Counterpart Application", dated Jun. 30, 2021, p. 1-p. 4.

* cited by examiner

*Primary Examiner* — Kyle J Moody
(74) *Attorney, Agent, or Firm* — JCIPRNET

(57) ABSTRACT

A power converter is provided. A power communication module controls a secondary side voltage control circuit to output a voltage control signal according to a connection state signal. A primary side switch control circuit adjusts an operating frequency of switching a conduction state of an adjustment switch according to the voltage control signal, so as to adjust an output voltage of a transformer circuit.

15 Claims, 4 Drawing Sheets

POWER CONVERTER

CROSS-REFERENCE TO RELATED APPLICATION

This application claims the priority benefit of Taiwan application serial no. 109132825, filed on Sep. 23, 2020. The entirety of the above-mentioned patent application is hereby incorporated by reference herein and made a part of this specification.

BACKGROUND

Technical Field

The disclosure relates to an electronic device, and more particularly, to a power converter.

Description of Related Art

In recent years, with the advance of science and technology, electronic devices with various and diverse functions have been gradually developed. The electronic devices with various and diverse functions not only meet people's different needs but also are integrated into everyone's daily life and makes people's lives more convenient. Generally, an electronic device obtains power supply through an adapter providing the electronic device with relevant power to operate normally.

Conventional electronic products (e.g., laptops, mobile phones, and other related products) continue to increase, and the demand for power supply and charging equipment for these products is also increasing. For example, almost all countries and design manufacturers have energy-saving specifications for power supply/charging equipment. Therefore, the design of adapters must be continuously developed toward high conversion efficiency and low power loss. With the evolution of electronic products, the demand for output energy saving is getting higher and higher. When electronic products are not directly turned off and on standby, unnecessary energy consumption is generated. Therefore, it becomes more important to further design the adapters to improve the energy consumption caused by the standby of electronic products.

SUMMARY

The disclosure provides a power converter capable of effectively reducing power loss and further improving the redundant energy consumption generated by the standby of electronic products.

The power converter in the disclosure includes a transformer circuit, an adjustment switch, a primary side switch control circuit, a blocking switch, a secondary side voltage control circuit, and a power communication module. The transformer circuit includes a primary winding and a secondary winding and converts an input voltage into an output voltage. The adjustment switch is coupled between the primary winding and a ground. The primary side switch control circuit is coupled to the adjustment switch. The blocking switch is coupled between the secondary winding and the output terminal of the power converter. The power communication module is coupled to the blocking switch and the secondary side voltage control circuit and controls the secondary side voltage control circuit to output a voltage control signal according to a connection state signal. The primary side switch control circuit adjusts the operating frequency of switching the conduction state of the adjustment switch according to the voltage control signal to adjust the output voltage.

Based on the above, the power communication module in the embodiment in the disclosure is capable of controlling the secondary side voltage control circuit to output the voltage control signal according to the connection state signal, and the primary side switch control circuit adjusts the operating frequency of switching the conduction state of the adjustment switch according to the voltage control signal to adjust the output voltage of the transformer circuit. Therefore, the operating frequency of the primary side switch control circuit is changed according to the connection state signal, so that the power converter automatically enters an energy-saving mode when being turned off from the power supply object, which effectively reduces power loss and further improves the energy consumption when on standby.

DESCRIPTION OF THE EMBODIMENTS

Figure 1:
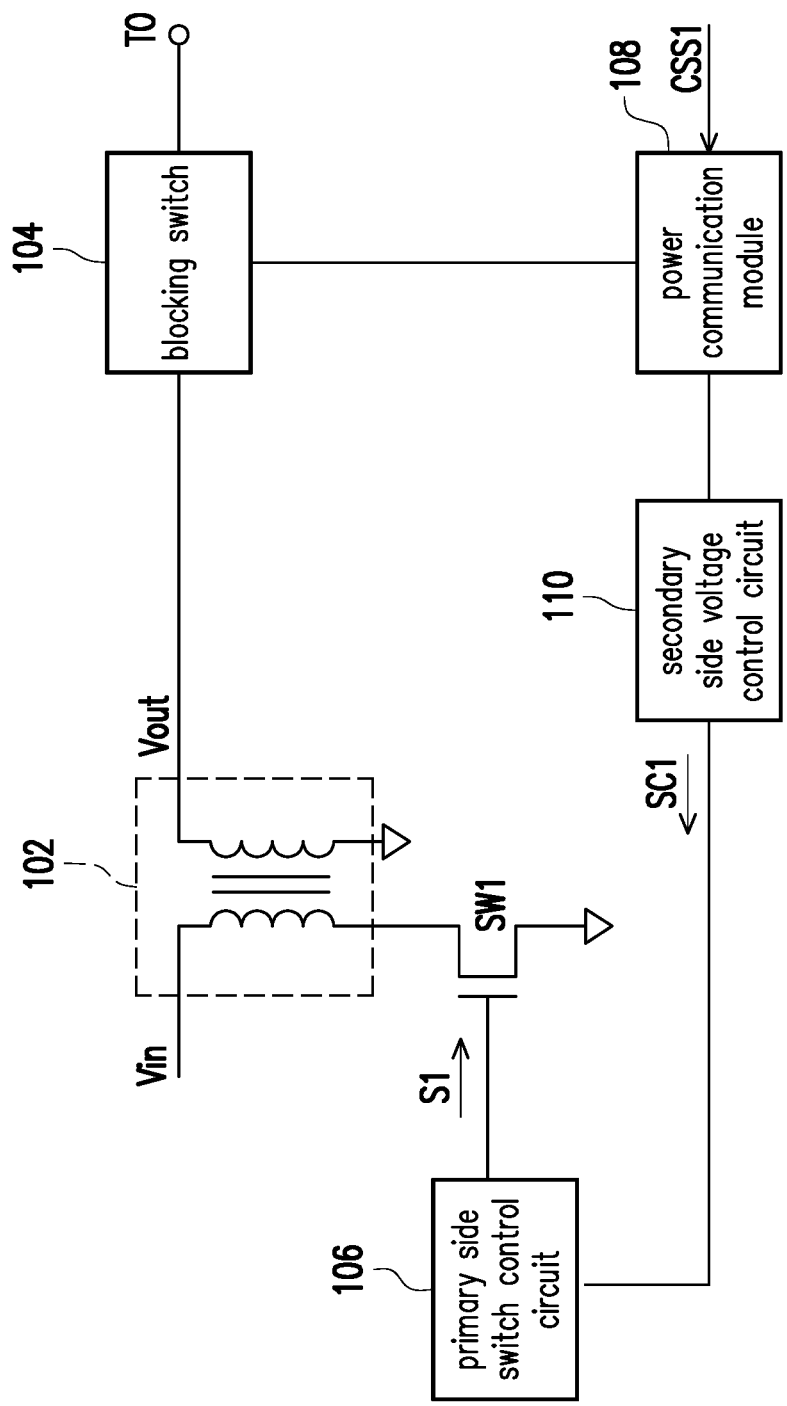
FIG. 1 is a schematic view of a power converter according to an embodiment of the disclosure.

FIG. 1 is a schematic view of a power converter according to an embodiment of the disclosure. Refer to FIG. 1. The power converter may be, for example, an adapter, which includes a transformer circuit 102, an adjustment switch SW1, a blocking switch 104, a primary side switch control circuit 106, a power communication module 108, and a secondary side voltage control circuit 110. The transformer circuit 102 has a primary winding and a secondary winding. The adjustment switch SW1 is coupled between the primary winding and a ground. The control terminal of the adjustment switch SW1 is coupled to the primary side switch control circuit 106. The adjustment switch SW1 may be, for example, implemented by a transistor, but the disclosure is not limited thereto. The blocking switch 104 is coupled between the secondary winding and the output terminal TO of the power converter. The power communication module 108 is coupled to the blocking switch 104 and the secondary side voltage control circuit 110. The secondary side voltage control circuit 110 is also coupled to the primary side switch control circuit 106.

The primary side switch control circuit 106 outputs a control signal S1 to switch the conduction state of the adjustment switch SW1. For example, a pulse width modulation signal is provided to the adjustment switch SW1 to switch the conduction state of the adjustment switch SW1, so that the transformer circuit 102 converts an input voltage Vin into an output voltage Vout. The power communication module 108 controls the secondary side voltage control circuit 110 to output a voltage control signal SC1 to the primary side switch control circuit 106 according to a connection state signal CSS1. The connection state signal CSS1 indicates the connection state between the output terminal TO of the power converter and the load (e.g., a laptop, a mobile phone, or other electronic devices). In some embodiments, the connection state signal CSS1 may be, for example, a configuration channel pin (CC pin) signal, that is, the power communication module 108 may determine whether the output terminal TO of the power converter is connected to the load according to a voltage change at the configuration channel pin. For example, when the voltage value of the configuration channel pin signal is 3.3V, this represents the output terminal TO of the power converter is not connected to the load, and when the voltage value of the configuration channel pin signal is 1.6V, this represents the output terminal TO of the power converter is connected to the load. The primary side switch control circuit 106 adjusts the operating frequency of switching the conduction state of the adjustment switch SW1 according to the voltage control signal SC1 to adjust the output voltage Vout. For example, corresponding to the voltage control signals with different voltage values, the primary side switch control circuit 106 may switch the conduction state of the adjustment switch SW1 at different operating frequencies according to the voltage control signals SC1. Note that the voltage value of the configuration channel pin signal is only an exemplary embodiment, and in other embodiments, the voltage value of the configuration channel pin signal may also be other voltage values.

For example, when the connection state signal CSS1 indicates that the output terminal TO of the power converter is not connected to the load, the power communication module 108 may control the secondary side voltage control circuit 110 to output the voltage control signal SC1 to the primary side switch control circuit 106. In this way, the primary side switch control circuit 106 reduces the operating frequency of switching the conduction state of the adjustment switch SW1 according to the voltage control signal SC1, so that the purpose of reducing power loss and further improving energy consumption when the power converter is on standby is achieved.

In some embodiments, the primary side switch control circuit 106 also enables the power converter to enter a hiccup mode according to the voltage control signal SC1. In the hiccup mode, the primary side switch control circuit 106 periodically stops switching the conduction state of the adjustment switch to reduce power loss. For example, the primary side switch control circuit 106 may enter a switching period and a stop period alternately. During the switching period, the primary side switch control circuit 106 switches the conduction state of the adjustment switch SW1 at a preset operating frequency; and during the stop period, the primary side switch control circuit 106 does not switch the conduction state of the adjustment switch SW1, for example, keeping it in an off-state. The stop period is greater than the duty cycle (i.e., the reciprocal of the preset operating frequency) of the primary side switch control circuit 106 during the switching period. In some embodiments, in the hiccup mode, the primary side switch control circuit 106 also reduces power loss by the operating frequency of switching the adjustment switch, for example, alternately switching the conduction state of the adjustment switch at a first operating frequency and a second operating frequency to reduce power loss. The first operating frequency is different from the second operating frequency. For example, the first operating frequency may be much greater than the second operating frequency, but the disclosure is not limited thereto.

In some embodiments, the power communication module 108 also turns off the blocking switch 104 when the output terminal TO of the power converter is not connected to the load to further reduce power loss. When the connection state signal CSS1 indicates that the output terminal TO of the power converter is connected to the load, the power communication module 108 turns on the blocking switch 104 so that the output voltage Vout of the transformer circuit 102 is provided to the load through the blocking switch 104. In addition, when the output terminal TO of the power converter is connected to the load, the power communication module 108 communicates with the load to determine the operating voltage required by the load and inform the load of the operating voltage that the power converter provides. The load returns a wake-up signal to the power communication module 108 to wake up the power converter to enter a normal operating mode and provide the operating voltage required for the operation of the load. The operating voltage required for the operation of the load may be, for example, a fixed voltage. The power communication module 108 controls the secondary side voltage control circuit 110 to output the voltage control signal SC1 to the primary side switch control circuit 106, so that the primary side switch control circuit 106 switches the conduction state of the adjustment switch SW1 at a fixed operating frequency, and thereby the transformer circuit 102 converts the input voltage Vin into a fixed voltage (e.g., a voltage of 5V, 9V, 15V, 15V, or 20V, but the disclosure is not limited thereto) corresponding to a fixed operating frequency to meet the requirements of the load for the operating voltage.

Figure 2:
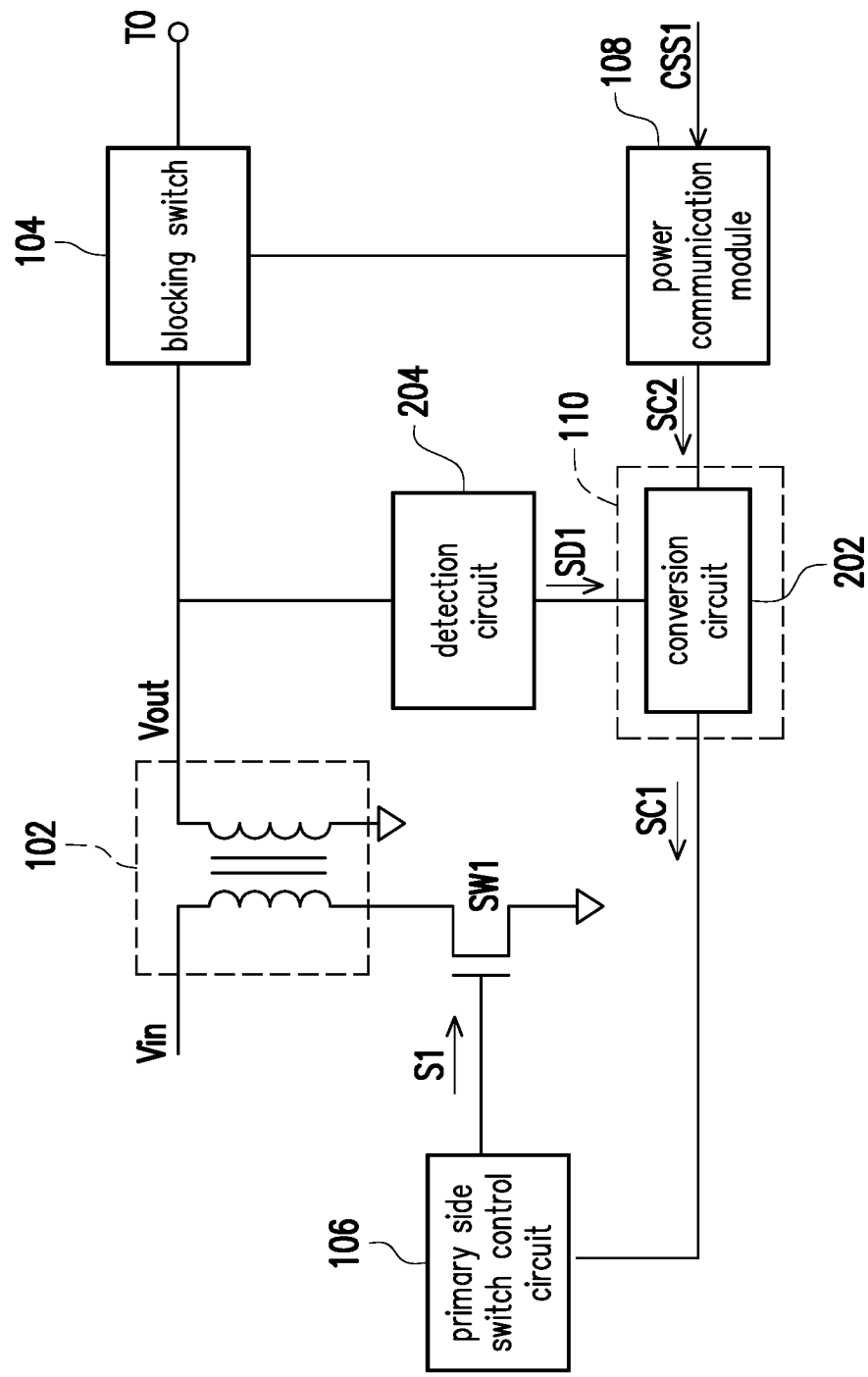
FIG. 2 is a schematic view of a power converter according to another embodiment of the disclosure.

FIG. 2 is a schematic view of a power converter according to another embodiment of the disclosure. Refer to FIG. 2. In the embodiment, the secondary side voltage control circuit 110 includes a conversion circuit 202, and the power converter further includes a detection circuit 204. The conversion circuit 202 is coupled to the primary side switch control circuit 106, the power communication module 108, and the detection circuit 204. The detection circuit 204 is also coupled to the output terminal of the transformer circuit 102. The power communication module 108 outputs an operating frequency control signal SC2 to the conversion circuit 202 according to the connection state signal CSS1, and the conversion circuit 202 converts the operating frequency control signal SC2 into the voltage control signal SC1, so that the primary side switch control circuit 106 switches the adjustment switch SW1 according to the voltage control signal SC1, and thereby the output voltage Vout of the transformer circuit 102 is controlled. For example, when the connection state signal CSS1 indicates that the power converter is not connected to the load, the conversion circuit 202 converts the operating frequency control signal SC2 provided by the power communication module 108 into the voltage control signal SC1, so that the primary side switch control circuit 106 reduces the operating frequency of switching the adjustment switch SW1 according to the voltage control signal SC1, thereby reducing power loss.

When the connection state signal CSS1 indicates that the power converter is connected to the load, the power communication module 108 controls the secondary side voltage control circuit 110 to output the voltage control signal SC1 according to a detection signal SD1 generated by the detection of the output voltage Vout through the detection circuit 204. In detail, the conversion circuit 202 converts the detection signal SD1 into the voltage control signal SC1 and outputs the voltage control signal SC1 to the primary side switch control circuit 106, so that the primary side switch control circuit 106 switches the conduction state of the adjustment switch SW1 at a fixed operating frequency, and thereby the transformer circuit 102 converts the input voltage Vin into a fixed voltage corresponding to the fixed operating frequency, and then the fixed voltage served as the operating voltage required by the load is provided to the load.

Figure 3:
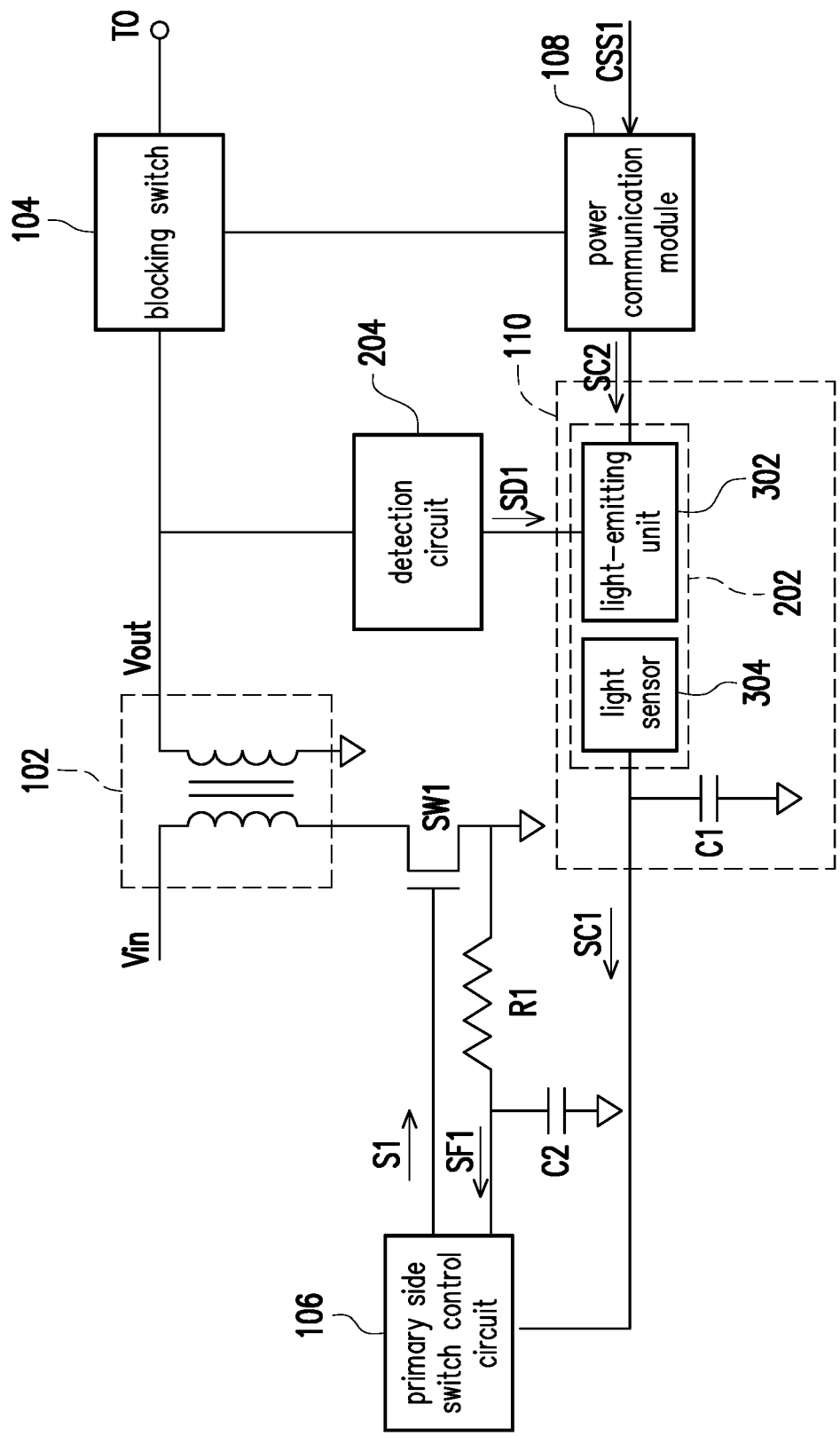
FIG. 3 is a schematic view of a power converter according to another embodiment of the disclosure.

FIG. 3 is a schematic view of a power converter according to another embodiment of the disclosure. Refer to FIG. 3. In the embodiment, the secondary side voltage control circuit 110 further includes a light-emitting unit 302, a light sensor 304, and a variable capacitor C1. The light-emitting unit 302 is coupled to the detection circuit 204 and the power communication module 108, the light sensor 304 is coupled to the primary side switch control circuit 106, and the variable capacitor C1 is coupled between the output terminal of the light sensor 304 and the ground. The light-emitting unit 302 is controlled by the power communication module 108 to convert the operating frequency control signal SC2 provided by the power communication module 108 into a light signal. In addition, the detection signal SD1 output by the detection circuit 204 is also converted into a light signal, that is, the power communication module 108 adjusts the light-emitting unit 302 through the operating frequency control signal SC2 according to the light signal output by the detection signal SD1. The light sensor 304 senses the light signal provided by the light-emitting unit 302 and generates the voltage control signal SC1 provided to the primary side switch control circuit 106, so that the primary side switch control circuit 106 switches the adjustment switch SW1 according to the voltage control signal SC1, thereby controlling the output voltage Vout of the transformer circuit 102. In addition, the power communication module 108 also adjusts the capacitance value of the variable capacitor C1, thereby adjusting the voltage value of the voltage control signal SC1, so that the adjustment method of adjusting the voltage value of the voltage control signal SC1 is much flexible.

In addition, the power converter in the embodiment further includes a resistor R1 and a capacitor C2. The first end of the resistor R1 is coupled to the adjustment switch SW1 that is coupled to one end of the ground, the second end of the resistor R1 is coupled to the primary side switch control circuit 106, and the capacitor C2 is coupled between the second end of the resistor R1 and the ground. The resistor R1 and the capacitor C2 are adapted to detect the current flowing through the adjustment switch SW1 and correspondingly provide the primary side switch control circuit 106 with a feedback signal SF1. The primary side switch control circuit 106 also switches the conduction state of the adjustment switch SW1 according to the feedback signal SF1 to control the output voltage Vout of the transformer circuit 102 in a much accurate manner.

Figure 4:
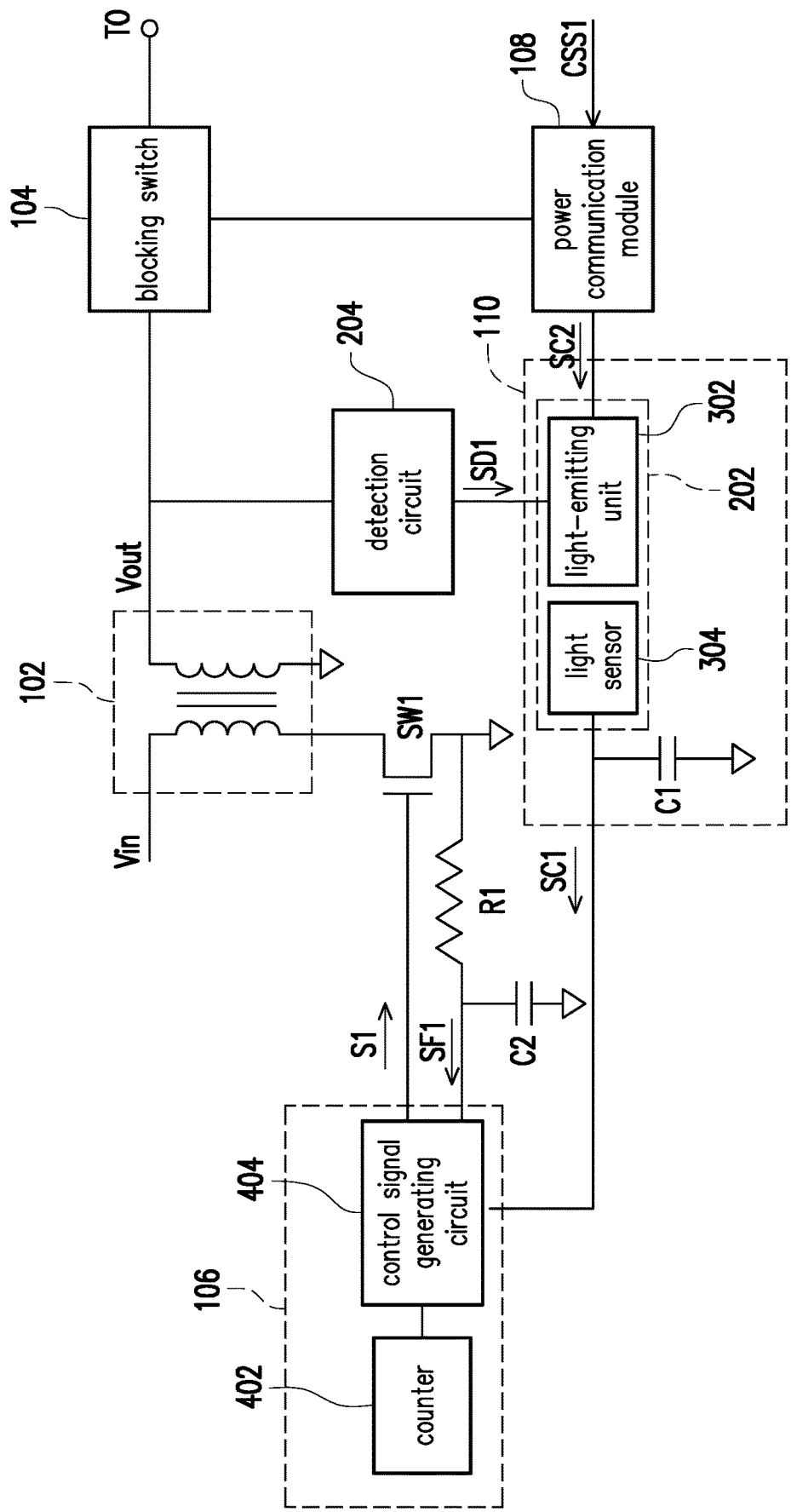
FIG. 4 is a schematic view of a power converter according to another embodiment of the disclosure.

FIG. 4 is a schematic view of a power converter according to another embodiment of the disclosure. Refer to FIG. 4. In the embodiment, the primary side switch control circuit 106 includes a counter 402 and a control signal generating circuit 404. The control signal generating circuit 404 is coupled to the counter 402 and the adjustment switch SW1. As described in the above embodiment, the power communication module 108 controls the secondary side voltage control circuit 110 to output the voltage control signal SC1 to the primary side switch control circuit 106 according to the connection state signal CSS1. The counter 402 in the embodiment determines whether the output terminal TO of the power converter is connected to the load according to the voltage control signal SC1, and starts counting when the connection state signal CSS1 indicates that the output terminal TO of the power converter is not connected to the load. In some embodiments, the voltage control signal SC1 may also be generated by the secondary side voltage control circuit 110 according to the detection signal SD1, that is, the counter 402 may also determine whether the output terminal TO of the power converter is connected to the load according to the output voltage Vout of the transformer circuit 102.

When the counter 402 determines that the output terminal TO of the power converter is not connected to the load according to the voltage control signal SC1, the counter 402 starts counting. The control signal generating circuit 404 outputs the control signal S1 according to the count value of the counter 402 to control the conduction state of the adjustment switch SW1, so that the transformer circuit 102 converts the input voltage Vin into a preset voltage. For example, the control signal generating circuit 404 may reduce the operating frequency of switching the conduction state of the adjustment switch SW1 when the count value of the counter 402 reaches a preset count value, so that the transformer circuit 102 converts the input voltage Vin into a sleep voltage, thereby reducing power loss. In addition, in some embodiments, when the power converter is in a sleep state and the output terminal TO of the power converter is reconnected to the load, the counter 402 may determine that the output terminal TO of the power converter is reconnected to the load according to the voltage control signal SC1 and restart counting. The control signal generating circuit 404 may output the control signal S1 when the count value of the counter 402 reaches the preset count value to increase the operating frequency of switching the conduction state of the adjustment switch SW1, and restore the operating frequency of switching the conduction state of the adjustment switch SW1 to the preset fixed frequency, so that the power converter is returned to the normal mode to provide the operating voltage required for the operation of the load.

Based on the above, the power communication module in the embodiment is capable of controlling the secondary side voltage control circuit to output the voltage control signal according to the connection state signal, and the primary side switch control circuit adjusts the operating frequency of switching the conduction state of the adjustment switch according to the voltage control signal to adjust the output voltage of the transformer circuit. Therefore, the operating frequency of the primary side switch control circuit is changed according to the connection state signal, so that the power converter automatically enters the energy-saving mode when being turned off from the power supply object, that is, without being controlled by an external device, the power converter itself is capable of performing energy-saving actions, which effectively reduces power loss and further improves energy consumption when on standby.

What is claimed is:

1. A power converter, comprising:
 a transformer circuit comprising a primary winding and a secondary winding and converting an input voltage into an output voltage;
 an adjustment switch coupled between the primary winding and a ground;
 a primary side switch control circuit coupled to the adjustment switch;
 a blocking switch coupled between the secondary winding and an output terminal of the power converter;
 a secondary side voltage control circuit; and
 a power communication module coupled to the blocking switch and the secondary side voltage control circuit and controlling the secondary side voltage control circuit to output a voltage control signal according to a connection state signal, wherein the primary side switch control circuit adjusts an operating frequency of switching a conduction state of the adjustment switch according to the voltage control signal to adjust the output voltage,
wherein the primary side switch control comprises:
a counter that starts counting when the output terminal of the power converter is not connected to a load; and
a control signal generating circuit coupled to the counter and the adjustment switch, wherein when counting to a preset count value, the counter outputs a control signal to control the conduction state of the adjustment switch, so that the transformer circuit converts the input voltage into a preset voltage.

2. The power converter according to claim 1, wherein when the connection state signal indicates that the output terminal of the power converter is not connected to a load, the power communication module turns off the blocking switch.

3. The power converter according to claim 2, wherein the primary side switch control circuit reduces the operating frequency of switching the conduction state of the adjustment switch according to the voltage control signal.

4. The power converter according to claim 3, wherein the primary side switch control circuit periodically stops switching the conduction state of the adjustment switch according to the voltage control signal.

5. The power converter according to claim 1, wherein when the connection state signal indicates that the output terminal of the power converter is connected to a load, the power communication module turns on the blocking switch.

6. The power converter according to claim 5, further comprising:
a detection circuit coupled to the transformer circuit and the secondary side voltage control circuit to detect the output voltage to generate a detection signal, wherein the secondary side voltage control circuit outputs the voltage control signal according to the detection signal, and the primary side switch control circuit switches the conduction state of the adjustment switch at a fixed operating frequency according to the voltage control signal.

7. The power converter according to claim 6, wherein the transformer circuit converts the input voltage into a fixed voltage corresponding to the fixed operating frequency.

8. The power converter according to claim 1, wherein the secondary side voltage control circuit comprises:
a conversion circuit coupled to the power communication module and receiving an operating frequency control signal output by the power communication module according to the connection state signal, wherein the conversion circuit converts the operating frequency control signal into the voltage control signal.

9. The power converter according to claim 8, wherein the conversion circuit comprises:
a light-emitting unit coupled to the power communication module and controlled by the power communication module to convert the operating frequency control signal into a light signal; and
a light sensor sensing the light signal to generate the voltage control signal.

10. The power converter according to claim 9, wherein the conversion circuit further comprises:
a variable capacitor coupled between an output terminal of the light sensor and the ground and controlled by the power communication module to adjust a capacitance value.

11. The power converter according to claim 1, further comprising:
a detection circuit coupled to the transformer circuit and the secondary side voltage control circuit to detect the output voltage to generate a detection signal, wherein the secondary side voltage control circuit outputs the voltage control signal according to the detection signal, and the counter determines whether the output terminal of the power converter is connected to the load according to the voltage control signal.

12. The power converter according to claim 1, wherein the counter determines whether the output terminal of the power converter is connected to the load according to the voltage control signal, and starts counting when the connection state signal indicates that the output terminal of the power converter is not connected to the load.

13. The power converter according to claim 1, wherein the adjustment switch comprises:
a transistor, wherein a first end of the transistor is coupled to the primary winding, a second end of the transistor is coupled to the ground, and a control end of the transistor is coupled to the primary side switch control circuit.

14. The power converter according to claim 13, further comprising:
a resistor, wherein a first end of the resistor is coupled to the second end of the transistor, and a second end of the resistor is coupled to the primary side switch control circuit; and
a capacitor coupled between the second end of the resistor and the ground.

15. The power converter according to claim 1, wherein the connection state signal is a configuration channel pin signal.

* * * * *